July 21, 1959

G. E. COATS 2,895,519

WHEEL SUPPORTING AND CLAMPING APPARATUS

Filed July 25, 1956

INVENTOR.
GILBERT E. COATS
BY
Rudolph L. Lowell
ATTORNEY.

July 21, 1959
G. E. COATS
2,895,519
WHEEL SUPPORTING AND CLAMPING APPARATUS
Filed July 25, 1956
2 Sheets-Sheet 2
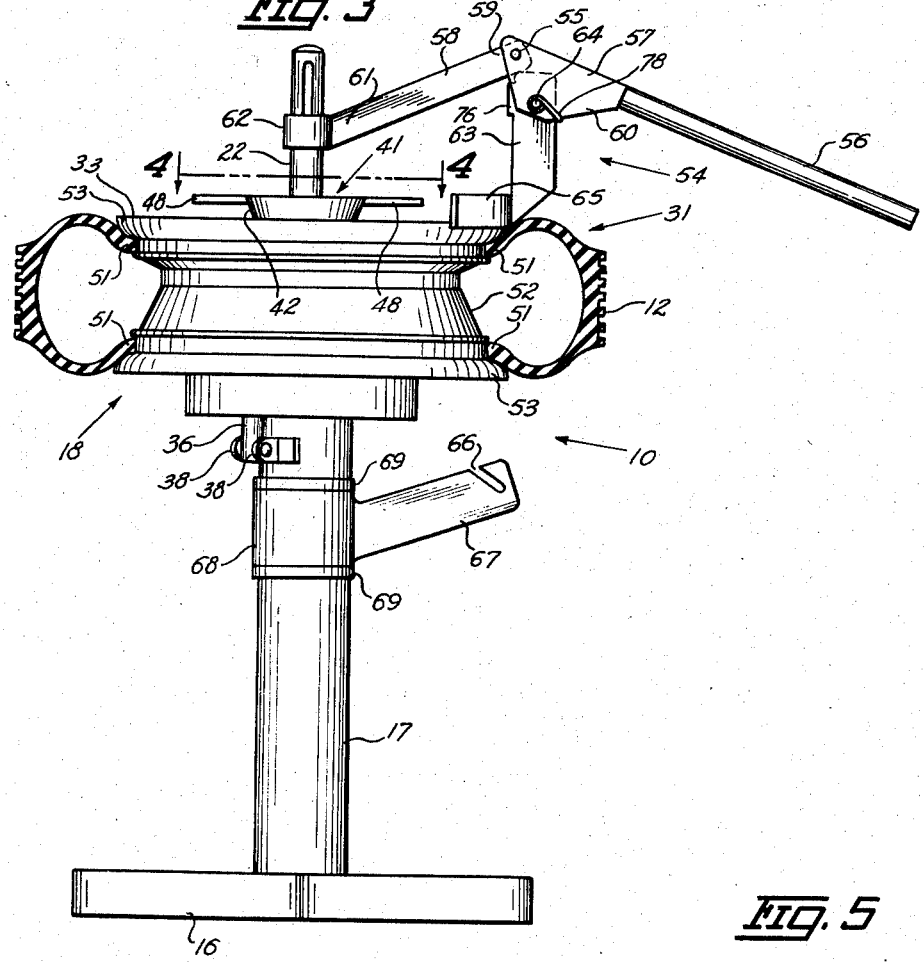
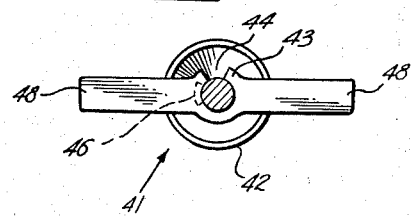
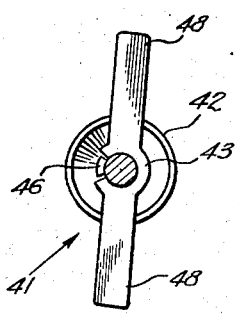
INVENTOR.
GILBERT E. COATS
BY
Rudolph L. Lowell
ATTORNEY.

United States Patent Office 2,895,519
Patented July 21, 1959

2,895,519

WHEEL SUPPORTING AND CLAMPING APPARATUS

Gilbert E. Coats, Fort Dodge, Iowa

Application July 25, 1956, Serial No. 600,045

2 Claims. (Cl. 144—288)

This invention relates generally to tire dismounting apparatus and more particularly to a device for moving the beads of a pneumatic tire out of engagement with complementary portions of the rim of a wheel for the tire.

An object of this invention is to provide an improved device for moving the beads of a pneumatic tire out of engagement with complementary portions of the rim of a wheel for the tire or in other words for "breaking" the beads.

A further object of this invention is to provide tire dismounting apparatus which includes a single shoe and handle assembly which is movable to a pair of supported positions for breaking both beads of a tire.

Another object of this invention is to provide tire dismounting apparatus which includes a tire clamping unit operable to quickly clamp a wheel and tire assembly onto the apparatus.

A further object of this invention is to provide tire dismounting apparatus which includes a tire clamping unit movable to a position in which a single turn of the unit of less than one revolution is operable to clamp a wheel onto the apparatus.

Yet another object of this invention is to provide tire dismounting apparatus which is simple in construction, economical to manufacture, and efficient in operation to quickly and easily roll the beads of a pneumatic tire out of engagement with the complementary portions of a wheel rim.

Further objects, features and advantages of this invention will become apparent from a consideration of the following description when taken in connection with the accompanying drawing in which:

Fig. 3 is a side elevational view of the tire dismounting device of this invention, illustrated similarly to Fig. 1, and showing the device in a position for breaking the upper tire bead;

Fig. 4 is a transverse sectional view looking along the line 4—4 in Fig. 3; and

Fig. 5 is a transverse sectional view, illustrated similarly to Fig. 4, showing the wheel clamping unit in the device of this invention in a moved position relative to the position shown in Fig. 4.

Figure 1:
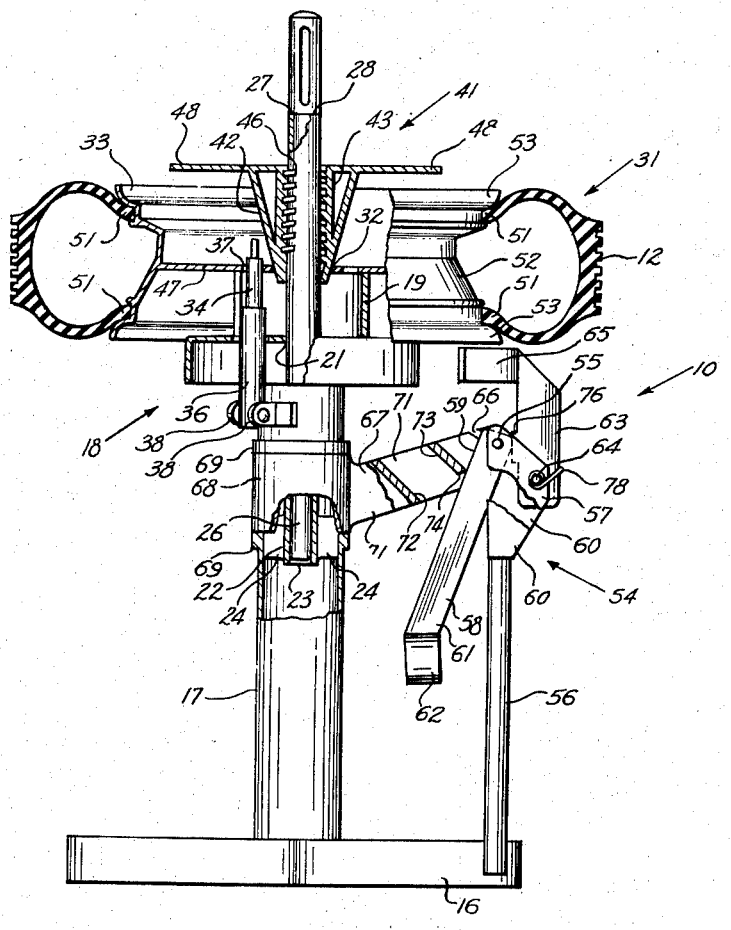
Fig. 1 is a side elevational view of the tire dismounting device of this invention, shown in assembled relation with a tire and wheel assembly, and showing the device in a position for breaking the lower tire bead, with some parts broken away and other parts shown in section for the purpose of clarity.

With reference to the drawing, the tire dismounting device of this invention, indicated generally at 10, is illustrated in Fig. 1 as including a flat rectangular base 16 adapted to be supported on a floor surface and having a central tubular standard 17 secured to and projected upwardly from a central position on the base 16. Mounted on the upper end of the standard 17, in a concentric relation therewith, is a wheel supporting table unit 18 which includes an upwardly extended tubular member 19.

Coaxially arranged in a spaced relation within the standard 17 and projected upwardly therefrom through a central opening 21 in the table unit 18, is a tubular bearing 22, the lower end 23 of which terminates at a position substantially midway between the opposite ends of the standard 17 (Fig. 1). The bearing 22 is supported in a fixed spaced relation within the standard 17 by the provision of wing or brace members 24 secured to and extended between the bearing 22 and the standard 17. Rotatably supported within the bearing 22 is an elongated bar 26 maintained against an axial movement relative to the bearing 22 by a shoulder 27 on the bar 26 which rests on the upper end 28 of the bearing 22.

It is seen, therefore, that the bearing 22 and the bar 26 form an integral part of and constitute an upward extension of the standard 17, with the standard 17, bearing 22 and bar 26 constituting a center post for the table unit 18.

In mounting a tire and wheel assembly 31 (Fig. 1), consisting of a tire 12 mounted on a wheel 33, on the device 10, the assembly 31 is arranged in a flat horizontally supported position on the tubular member 19, with the bearing 22 extended upwardly through a central opening 32 in the wheel 33. With the assembly 31 in this horizontal position, the extensible outer portion 34 of a dowel unit 36, pivotally secured to ears 38 carried on the standard 17 at a position below the table unit 18, is extended through one of the lug receiving apertures 37 in the wheel 33 to hold the wheel against rotation on the table unit 18. As best appears in Fig. 1, in this supported position of the assembly 31, the extension of the standard 17, namely, the bearing 22 and the bar 26 project above the assembly 31.

The wheel 33 is centered relative to the standard 17 and in turn relative to the rotary bar 26 by the provision of a wheel clamping unit 41 (Figs. 4 and 5) which includes a cone member 42 having a tubular hub 43. As best appears in Fig. 4, the hub 43 has a slot 44 extended longitudinally thereof over its full length. The slot 44 is of a width slightly greater than a series of threads 46 formed on and extended outwardly of the bearing 22 at a position adjacent to and above the tubular member 19. The hub 43 is internally threaded for meshing engagement with the built up threads 46 for a purpose to appear presently.

In use, the clamping unit 41 is moved downwardly on the bearing 22, with the slot 44 vertically aligned with the threads 46, to an engaged position with the wheel 33 within the central wheel opening 32. On rotation of the clamping unit 41, by means of a pair of outwardly extended handle portions 48 formed on the upper end of the cone member 42, the hub 43 is advanced downwardly on the built up threads 46 to tightly clamp the wheel 33 against the tubular member 19. Since the cone member 42 is in engagement with the wheel 33, a turn of the unit 41 of less than one revolution is sufficient to accomplish the necessary clamping action.

Figure 2:
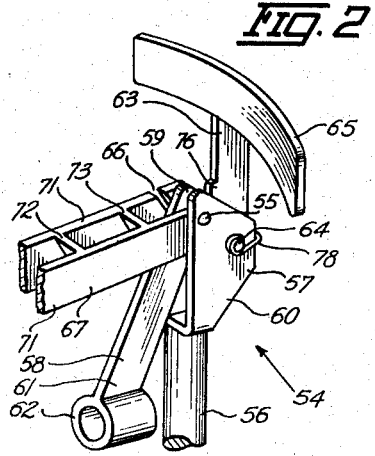
Fig. 2 is a fragmentary perspective view of a portion of the device shown in Fig. 1.

Removably mounted on the device 10 for moving the tire beads 51 inwardly of the wheel rim 52 and out of engagement with the complementary rim portions 53, or in other words for breaking the tire beads 51, is a lever and shoe assembly, indicated generally at 54 (Figs. 1, 2 and 3). The assembly 54 includes a handle 56 having a bifurcated end portion 57 (Figs. 1 and 2) consisting of two parallel plates 60. Rotatably supported on a pivot member 55 extended between the plates 60 is one end 59 of a lever 58, the opposite end 61 of which terminates in a tubular portion 62.

The assembly 54 further includes a curved shoe 65 carried on one end of a supporting strap 63 arranged between and supported on a pivot 64 on the plates 60.

In the assembly of the shoe and lever assembly 54 with the device 10 to break the lower tire bead, the pivot member 55 is assembled in an inclined slot 66 in an arm member 67 carried on a ring or bearing member 68 rotatably received on the tubular standard 17 and maintained against axial movement thereon by a pair of stop rings 69. The arm member 67 has parallel side portions 71 (Figs. 1 and 2) maintained in a spaced relation by a pair of connecting braces 72 and 73. As best appears in Fig. 1, the brace 73 has its lower end 74 in engagement with the arm 58 in the inoperative position of the assembly 54 illustrated in Fig. 1. The shoe supporting strap 63 has a built up portion 76 which engages the end 59 of the lever 58 when the lever 58 is against the brace 73 to support the shoe 65 in a position adjacent the juncture of the lower tire bead 51 and the rim 52. A torsion spring 78 carried on the pivot 64 and engaged with the strap 63 biases the shoe 65 in a direction inwardly of the device 10 as viewed in Fig. 1.

Thus for a wheel and rim assembly of a predetermined size, the relative arrangement of the strap 63, lever 58 and brace 73 provides for an automatic positioning of the shoe 65 at the juncture of the lower bead 51 and rim 52. In one embodiment of the invention, this predetermined size is a fifteen inch rim 52.

On upward manual swinging movement of the lever 56, the shoe 65 is moved against the tire 12 to roll the bead 51 off the complementary rim portion 53 in a manner identical with that described in detail in my copending application Serial No. 555,557. For wheel rims 52 of smaller or larger size than illustrated in Fig. 1, it is only necessary to manually position or guide the shoe 65 into engagement with the tire adjacent a lower bead 51 to break the bead.

After the lower bead 51 is broken, the assembly 54 is manually lifted upwardly until the pivot 55 is in a clearance relation with the slot 66 in the arm 67. The assembly 54 is moved to a position above the tire and wheel assembly 31 and the tubular portion 62 of the lever 58 is rotatably supported on the bearing member 22 as shown in Fig. 3. The shoe 65 is then manually positioned against the tire 12 adjacent the upper bead 51 and downward manual pressure is exerted on the handle 56 to break the upper tire bead 51. The bead is completely broken by rotating the assembly about the bearing 22 with the tubular lever portion 62 rotating thereon.

It can thus be seen that in the device 10 only a single lever and shoe assembly 54 is required. By virtue of the slot 66 in the arm 67, the assembly 54 is readily moved to and from a position for breaking the lower bead 51.

From the above description, it can be seen that this invention provides in addition to a tire dismounting device 10 which requires only a single shoe and lever assembly 54, a clamping unit 41 which may be readily assemblied with the device 10 to clamp a tire and wheel assembly 31 thereto. As a result of the cooperative relation of the threaded hub 43 in the unit 41 and the built up threads 46 on the bearing member 22, a minimum amount of time is required in the assembly and disassembly of the clamping unit 41 with the device 10.

Although the invention has been described with respect to a preferred embodiment thereof, it is to be understood that it is not to be so limited, since changes can be made therein which are within the scope of the appended claims.

I claim:

1. In a device for moving the bead of a pneumatic tire away from a complementary portion of a rim of a wheel on which the tire is mounted, said device comprising a center post having a table, means operatively associated with said post and table for holding said wheel and tire in a supported position on one side of said table in a centered relation with said post, said means including threads built up on a portion of said post above said wheel and tire and extended partially about the periphery thereof, a cone member having a tubular internally threaded hub portion extended axially thereof of a size to be received on said center post, said hub having a pair of outwardly extended handle portions formed thereon, said hub having an internal slot therein extended longitudinally thereof of a width corresponding to the peripheral length of said threads so that said cone member is axially movable along said center post to an engaged position of said cone member with said wheel for subsequent rotation of said cone member to advance said hub portion on said built up threads to clamp said wheel to said table.

2. Apparatus for supporting a wheel and tire assembly in a fixed substantially horizontal position for removal of the tire from the wheel, said apparatus comprising an upright center post, a table unit having an upwardly extended tubular portion supported on said center post intermediate the ends thereof in a concentric relation therewith, a wheel clamping unit comprising a truncated cone shape member provided with an internally threaded hub extended axially of said cone member and provided with an internal slot extended over the full length of said hub, built up threads formed on said center post at a position above and adjacent to said tubular portion for meshing engagement with the threads of said hub, said built up threads being of a length peripherally of said center post less than the width of said slot, so that said cone member is movable longitudinally of said center post into engagement with a wheel supported on the upper end of said tubular member with said built up threads in said slot and subsequently rotatable less than one revolution to advance said hub on said built up threads to clamp said wheel between said tubular member and said cone member.

References Cited in the file of this patent

UNITED STATES PATENTS

| | | |
|---|---|---|
| 589,668 | Noble et al. | Sept. 7, 1897 |
| 1,255,381 | Bundy | Feb. 5, 1918 |
| 1,959,655 | Brouhard | May 22, 1934 |
| 2,057,200 | McCarthy | Oct. 13, 1936 |
| 2,471,642 | Moltz | May 31, 1949 |
| 2,505,172 | Coats | Apr. 25, 1950 |
| 2,609,039 | Henderson | Sept. 2, 1952 |
| 2,695,659 | Athmann | Nov. 30, 1954 |
| 2,708,954 | Schultz | May 24, 1955 |
| 2,783,830 | Pozericki et al. | Mar. 5, 1957 |

FOREIGN PATENTS

| | | |
|---|---|---|
| 139,688 | Great Britain | Mar. 11, 1920 |
| 1,107,075 | France | Dec. 28, 1955 |